(12) United States Patent
Weaver

(10) Patent No.: US 10,118,437 B1
(45) Date of Patent: Nov. 6, 2018

(54) ADJUSTABLE TAXIDERMY MOUNTING STAND

(71) Applicant: Joseph Neil Weaver, Cody, WY (US)

(72) Inventor: Joseph Neil Weaver, Cody, WY (US)

( * ) Notice: Subject to any disclaimer, the term of this patent is extended or adjusted under 35 U.S.C. 154(b) by 0 days.

(21) Appl. No.: 15/480,137

(22) Filed: Apr. 5, 2017

Related U.S. Application Data

(60) Provisional application No. 62/319,197, filed on Apr. 26, 2016.

(51) Int. Cl.
| | |
|---|---|
| *B44C 5/02* | (2006.01) |
| *F16M 11/10* | (2006.01) |
| *F16M 11/28* | (2006.01) |
| *F16M 11/04* | (2006.01) |

(52) U.S. Cl.
CPC ............. *B44C 5/02* (2013.01); *F16M 11/045* (2013.01); *F16M 11/048* (2013.01); *F16M 11/10* (2013.01); *F16M 11/28* (2013.01); *F16M 2200/027* (2013.01); *F16M 2200/066* (2013.01)

(58) Field of Classification Search
CPC ........... B44C 5/02; B44C 5/06; F16M 11/045; F16M 11/048; F16M 11/10; F16M 11/28; F16M 2200/027; F16M 2200/066

USPC .......... 248/125.8–125.9, 122.1, 124.1, 125.1
See application file for complete search history.

(56) References Cited

U.S. PATENT DOCUMENTS

| | | | |
|---|---|---|---|
| 3,606,409 A * | 9/1971 | Hawkins, Jr. | F16B 7/1418 248/411 |
| 4,145,006 A * | 3/1979 | Webb | B25H 1/00 269/69 |
| 2016/0243887 A1* | 8/2016 | Brewer | B44C 5/06 |

* cited by examiner

*Primary Examiner* — Christopher Garft
(74) *Attorney, Agent, or Firm* — Plager Schack LLP; Mark H. Plager; Kara Verryt

(57) ABSTRACT

An adjustable and maneuverable taxidermy stand may include a base assembly; a lower hinge assembly adjustably attached to the base assembly; an upper hinge assembly pivotally attached to the lower hinge assembly; a hub assembly adjustably attached to the upper hinge assembly; and at least one mounting plate assembly adjustably attached to the hub assembly. Each assembly may be attached to an adjacent assembly using a shaft collar subassembly. Each shaft collar subassembly may include a threaded collar half removably attached to a non-threaded collar half; and a fastener attaching the threaded collar half to the non-threaded collar half, wherein when the threaded collar half is attached to the non-threaded collar half an inner diameter of the shaft collar subassembly is sized to accommodate a shaft tubing from any of the various assemblies.

6 Claims, 5 Drawing Sheets

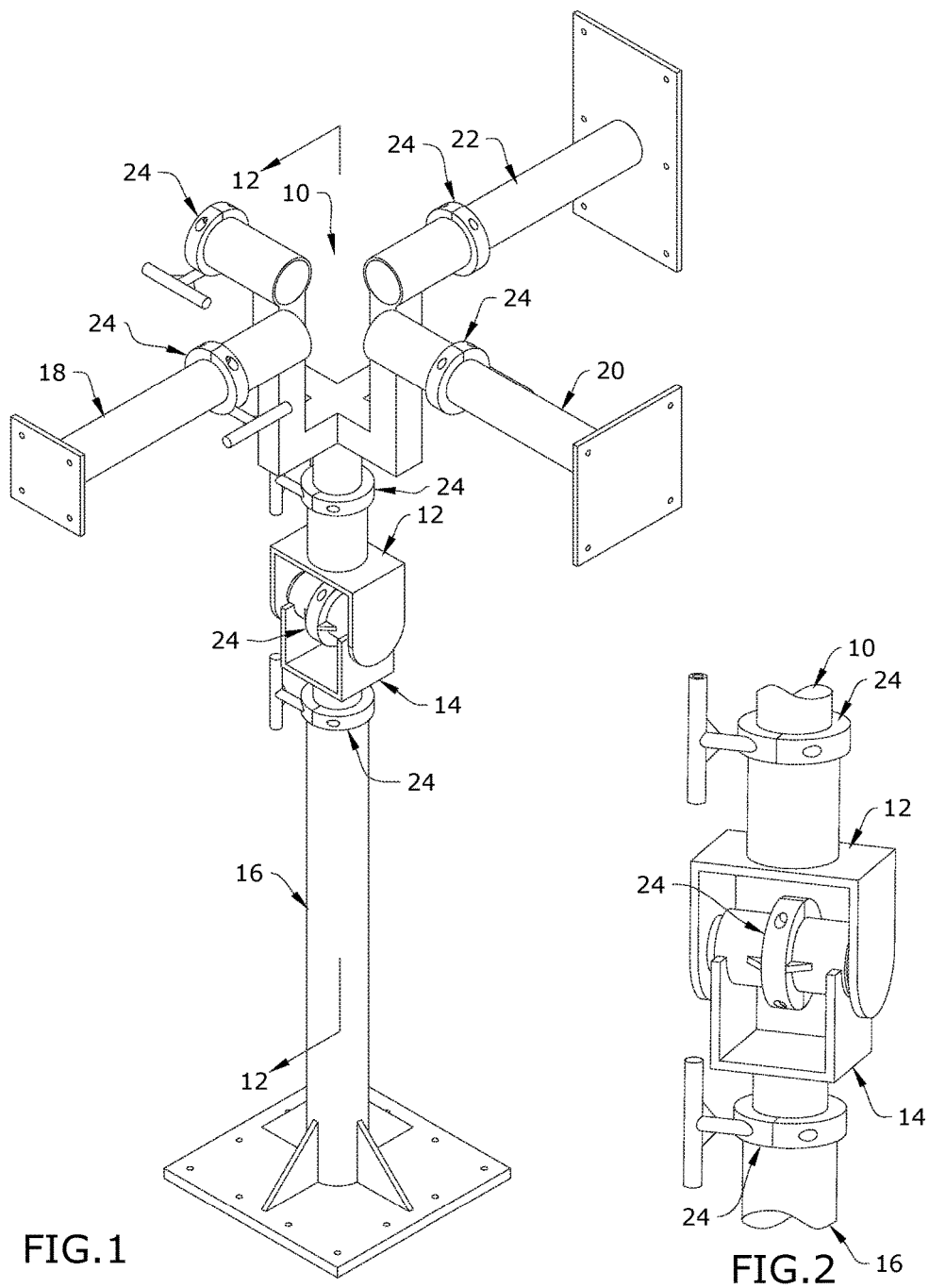

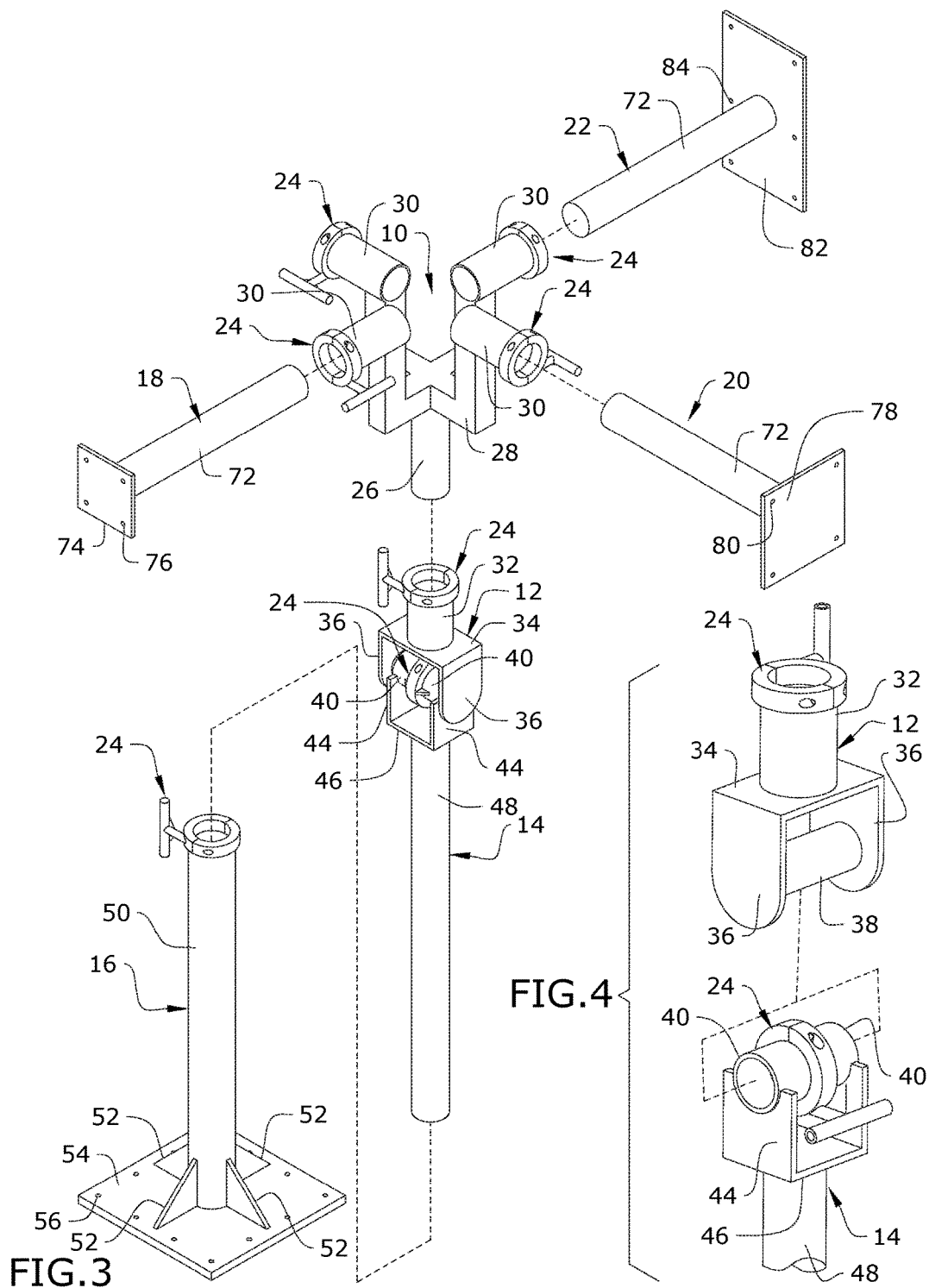

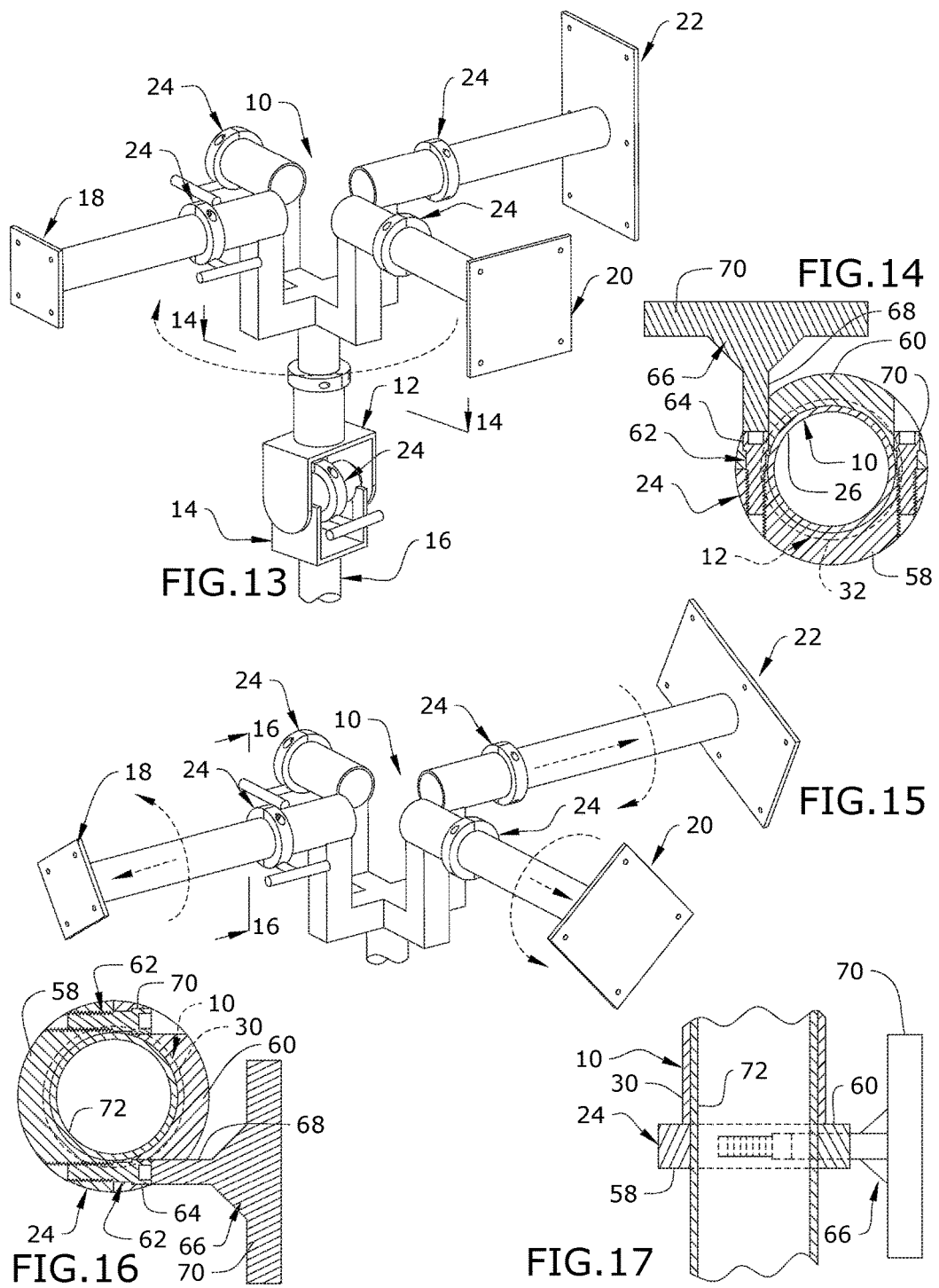

ADJUSTABLE TAXIDERMY MOUNTING STAND

RELATED APPLICATION

This application claims priority to provisional patent application U.S. Ser. No. 62/319,197 filed on Apr. 6, 2016 entire contents of which is herein incorporated by reference.

BACKGROUND

The embodiments herein relate generally to taxidermy, and more particularly, to an adjustable taxidermy mounting stand.

Existing taxidermy mounting stands tend to be flimsy and offer minimum maneuverability. The existing devices also use sets screws as a locking mechanism, which tend to scar the pipe and cause the mount to tip or roll in the stand.

Therefore, what is needed is a taxidermy mounting stand that provides increased maneuverability, adjustability, and stability without causing scarring on the pipe.

SUMMARY

Some embodiments of the present disclosure include an adjustable and maneuverable taxidermy stand. The taxidermy stand may include a base assembly; a lower hinge assembly adjustably attached to the base assembly; an upper hinge assembly pivotally attached to the lower hinge assembly; a hub assembly adjustably attached to the upper hinge assembly; and at least one mounting plate assembly adjustably attached to the hub assembly. Each assembly may be attached to an adjacent assembly using a shaft collar subassembly. Each shaft collar subassembly may include a threaded collar half removably attached to a non-threaded collar half; and a fastener attaching the threaded collar half to the non-threaded collar half, wherein when the threaded collar half is attached to the non-threaded collar half an inner diameter of the shaft collar subassembly is sized to accommodate a shaft tubing from any of the various assemblies.

BRIEF DESCRIPTION OF THE FIGURES

The detailed description of some embodiments of the invention is made below with reference to the accompanying figures, wherein like numerals represent corresponding parts of the figures.

FIG. 1 is a perspective view of one embodiment of the present disclosure.

FIG. 2 is a detail perspective view of one embodiment of the present disclosure.

FIG. 3 is an exploded view of one embodiment of the present disclosure.

FIG. 4 is an exploded conceptual view of one embodiment of the present disclosure.

FIG. 13 is a detail perspective view of one embodiment of the present disclosure.

FIG. 14 is a section detail view of one embodiment of the present disclosure, taken along line 14-14 in FIG. 13.

FIG. 15 is a detail perspective view of one embodiment of the present disclosure.

FIG. 16 is a section detail view of one embodiment of the present disclosure, taken along line 16-16 in FIG. 15.

FIG. 17 is a section detail view of one embodiment of the present disclosure, taken along line 17-17 in FIG. 6.

DETAILED DESCRIPTION OF CERTAIN EMBODIMENTS

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as a taxidermy stand and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

1. Base Assembly
2. Lower Hinge Assembly
3. Upper Hinge Assembly
4. Hub Assembly
5. Mounting Plate Assembly(ies)
6. Shaft Collar Subassembly(ies)

The various elements of the device of the present disclosure may be related in the following exemplary fashion. It is not intended to limit the scope or nature of the relationships between the various elements and the following examples are presented as illustrative examples only.

Figure 5:
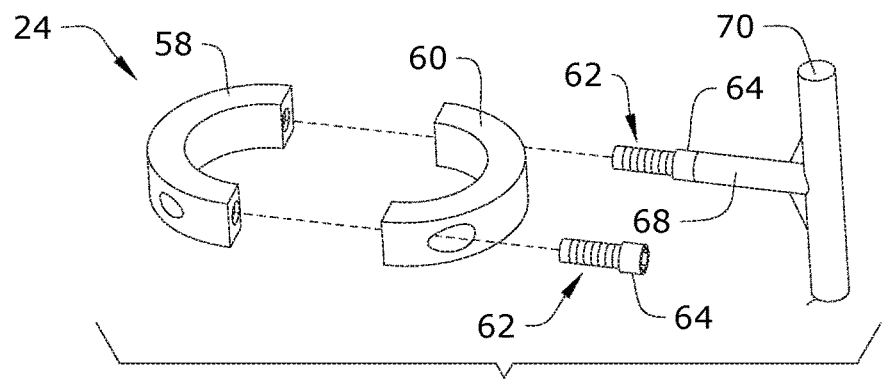
FIG. 5 is an exploded view of one embodiment of the present disclosure.
Figure 6:
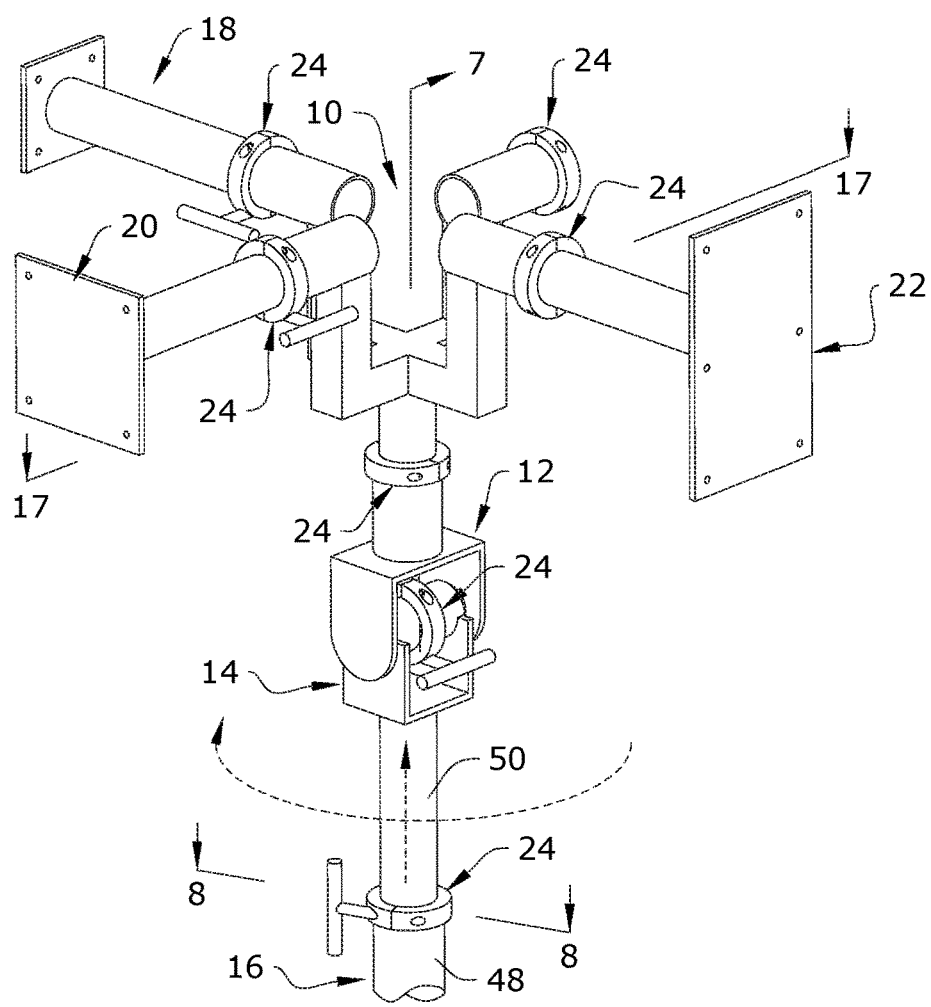
FIG. 6 is a perspective detail view of one embodiment of the present disclosure.
Figure 7:
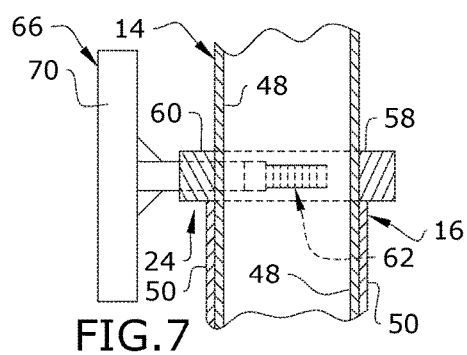
FIG. 7 is a section detail view of one embodiment of the present disclosure, taken along line 7-7 in FIG. 6.
Figure 8:
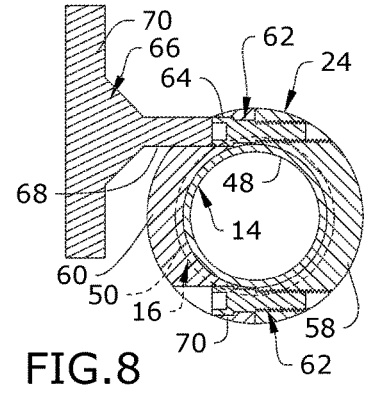
FIG. 8 is a section detail view of one embodiment of the present disclosure, taken along line 8-8 in FIG. 6.
Figure 9:
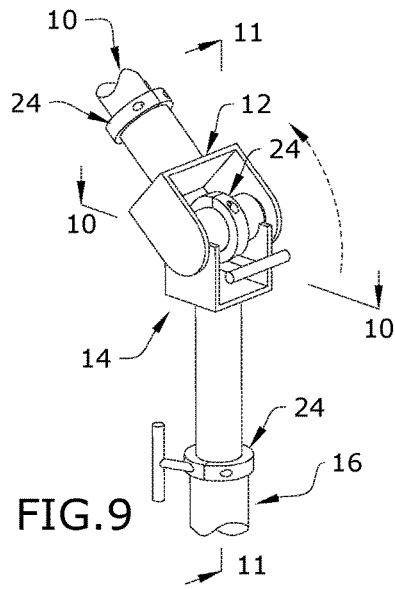
FIG. 9 is a detail perspective view of one embodiment of the present disclosure.
Figure 10:
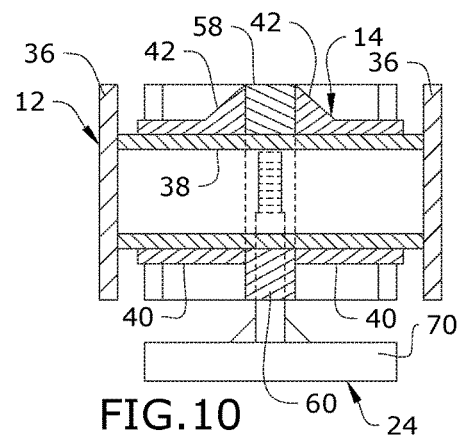
FIG. 10 is a section detail view of one embodiment of the present disclosure, taken along line 10-10 in FIG. 9.
Figure 11:
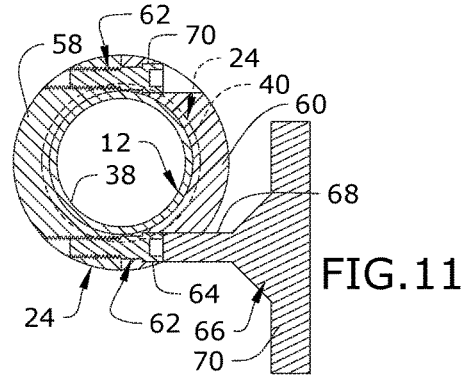
FIG. 11 is a section detail view of one embodiment of the present disclosure, taken along line 11-11 in FIG. 9.
Figure 12:
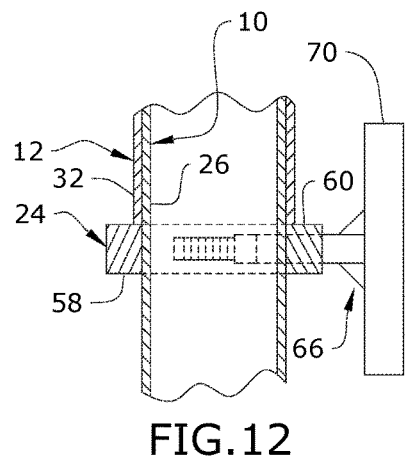
FIG. 12 is a section detail view of one embodiment of the present disclosure, taken along line 12-12 in FIG. 1.

By way of example, and referring to FIGS. 1-17, some embodiments of the present disclosure include an adjustable and maneuverable taxidermy stand, the taxidermy stand comprising a base assembly 16 designed to sit on or attach to a surface; a lower hinge assembly 14 adjustably attached to the base assembly 16; an upper hinge assembly 12 pivotally attached to the lower hinge assembly 14; a hub assembly 10 adjustably attached to the upper hinge assembly 12; and at least one mounting plate assembly adjustably attached to the hub assembly 10, wherein each assembly is attached to an adjacent assembly using a shaft collar subassembly 24.

As shown, for example, in FIGS. 5, 7, 8, 10-12, 14, 16, and 17, the shaft collar subassembly 24 may comprise a pair of collar halves, such as a threaded collar half 58 and a non-threaded collar half 60, removably attached to one another using a fastener 62, wherein when the collar halves are attached to one another, an inner diameter of the shaft collar subassembly 24 is sized to accommodate a shaft tubing. Embodiments of the fasteners 62 may include a threaded end and a fastener head 64, wherein the threaded end is designed to pass through a fastener channel in the non-threaded collar half 60 and screw into a threaded orifice in the threaded collar half 58 to secure the threaded collar half 58 to the non-threaded collar half 60. The shaft collar subassembly 24 may further include a knob 66 designed to engage with the fastener head 62 to tighten the fastener 62. In some embodiments, the knob 66 may comprise a T-shaped knob 66 with a knob head 70 perpendicularly attached to a knob shaft 68.

The base assembly 16 may comprise a base plate 54 with a base receiver pole 50 extending substantially perpendicularly therefrom. A plurality of base gussets 52 may attach a bottom portion of the base receiver pole 50 to an upper surface of the base plate 54, wherein the base gussets 52 may provide increased stability for the taxidermy stand. The base plate 54 may also comprise a plurality of base plate holes 56, wherein the base plate holes 56 may be used to secure the base plate 54 to a surface, such as a plywood base or directly to the floor. As shown in, for example, FIG. 3, the base receiver pole 50 may be hollow, wherein a shaft collar subassembly 24 may be attached to an end of the base receiver pole 50 distal from the base plate 54.

The lower hinge assembly 14 may comprise a lower hinge shaft tubing 48 having first end and a second end, wherein the first end is sized to be accommodated within the base receiver pole 50, wherein when the shaft collar subassembly on the base receiver pole 50 is tightened, the lower hinge shaft tubing 48 is held in place within the base receiver pole 50. Thus, the shaft collar subassembly 24 on the base receiver pole 50 allows a height of the lower hinge assembly 14 to be set. The second end of the lower hinge shaft tubing 48 may have a lower hinge plate 46 attached perpendicularly thereto. A pair of parallel lower hinge bracket arms 44 may extend perpendicularly outward from opposite edges of the lower hinge plate 46 (from an opposite surface of the lower hinge plate 46 as the lower hinge shaft tubing 48). Thus, the lower hinge plate 46 along with the two lower hinge bracket arms 44 may form a substantially squared-off U-shape. Each of the upper edges of the lower hinge bracket arms 44 (the edge distal from the lower hinge plate 46) may comprise a semi-circular cut-out. Each semi-circular cut-out may hold a pivot tube collar 40 that extends half the length of the lower hinge plate 46, such that the pivot tube collars 40 meet at a central portion of the lower hinge assembly 14. The pivot tube collars 40 may be attached to one another via a shaft collar subassembly 24, wherein lower hinge gussets 42 may attach the pivot tube collars 40 to the shaft collar subassembly 24 for additional stability and support. The pivot tube collars 40 may be hollow and may thus, together, create a channel extending the length of the lower hinge plate 46.

The upper hinge assembly 12 may comprise an upper hinge receiver pipe 32 with a first end and a second end. The first end of the upper hinge receiver pipe 32 may have an upper hinge plate 34 attached perpendicularly thereto. A pair of parallel upper hinge arms 36 may extend substantially perpendicular from the upper hinge plate 34, wherein the upper hinge arms 36 extend from a surface of the upper hinge plate 34 opposite the upper hinge receiver pipe 32. The upper hinge arms 36 may be spaced from one another, such that the first upper hinge arm 36 extends from an edge of the upper hinge plate 34 opposite the second upper hinge arm 36. Thus, the upper hinge plate 34 and the upper hinge arms 36 together may form a substantially squared off U-shape. A pivot tube 38 may extend from an inner surface of the first upper hinge arm 36 to an inner surface of the second upper hinge arm 36, wherein the pivot tube 38 may extend through the pivot tube collars 40 to pivotally attach the upper hinge assembly 12 to the lower hinge assembly 14. To lock the upper hinge assembly 12 in a particular position with respect to the lower hinge assembly 14, a user may simply tighten the shaft collar subassembly 24 around the pivot tube collars 40 and the pivot tube 38. The upper hinge receiver pipe 32 may be hollow with a shaft collar subassembly 24 removably attached to the second end thereof (the end of the upper hinge receiver pipe 32 opposite the upper hinge plate 34.

The hub assembly 10 may comprise a structure designed to adjustably attach mounting plate(s) to the upper hinge assembly 12. The hub assembly 10 may comprise, for example, a hub shaft tubing 26 with a first end and a second end, the first end being sized to be accommodated within the upper hinge bracket pipe 32, wherein the diameter of the hub shaft tubing 26 is such that when the shaft collar subassembly 24 at the end of the upper hinge receiver pipe 32 is tightened, the hub shaft tubing 26 is held in place within the upper hinge receiver pipe 32. The second end of the hub shaft tubing 26 (i.e., the end distal from the upper hinge receiver pipe 32) may be attached to an arm tubing structure 28. The arm tubing structure 28 may comprise a plurality of arms, such as four arms formed into a cross-shape. In some embodiments, as shown in FIG. 3 for example, each arm may include a 90° bend, wherein each arm bends away from the hub shaft tubing 26. A top surface of each arm (i.e., the surface most distal from the hub shaft tubing 26) may have a hub receiver pipe 30 attached thereto. Each hub receiver pipe 30 may be hollow with a shaft collar subassembly 24 attached to an end thereof distal from the arm tubing 28. Each hub receiver pipe 30 may be sized to accommodate a mounting plate shaft tube 72 from a mounting plate assembly.

The taxidermy stand of the present disclosure may be used with a plurality of mounting plate assemblies, wherein each mounting plate assembly comprises a mounting plate shaft tube 72 extending from a mounting plate. Exemplary mounting plate assemblies include a 4×4 mounting plate assembly 18 comprising a 4×4 mounting plate 74 with plate holes 76 attached to the mounting plate shaft tube 72; a 6×6 mounting plate assembly 20 comprising a 6×6 mounting plate 78 with plate holes 84 attached to the mounting plate shaft tube 72; and a 10×6 mounting plate assembly 22 comprising a 10×6 mounting plate 82 with plate holes 84 attached to the mounting plate shaft tube 72. In any case, the mounting plate shaft tube may extend substantially perpendicularly from the mounting plate and may be sized to fit within the hub receiver pipes 30, wherein when the shaft collar subassembly 24 on the hub receiver pipe 30 is tightened, the mounting plate shaft tube 72 is locked into place with respect to the hub receiver pipe 30.

To use the taxidermy stand of the present disclosure, a user may first screw, bolt, or otherwise attach the base plate 54 to a surface, such as plywood or the floor. The user's project may be screwed or otherwise attached to the mounting plate assembly, which may then be inserted into the hub receiver pipe 30 and locked into place using the shaft collar subassembly 24. The mounting plate assembly(ies) used may vary in plate size and shape depending on the particular project. The mounting plate assemblies may be removable and interchangeable. The user may then manually set the desired height by moving the lower hinge staff tubing 48 up and down within the base receiver pole 50 and locking it at its desired height using the shaft collar subassembly 24. The desired angle for the project may then be achieved by loosening the collar shaft subassembly 24 on the lower hinge assembly 14, moving to the desired angle, and locking it back in place. At any point during the mounting process, the user may freely move, adjust, and relock the positioning of the project simply by loosening and tightening any of the shaft collar subassemblies 24. The shaft collar subassemblies 24 may provide up to 360° of grab around the tubing without scarring it, resulting in a more soli lock and allowing more weight to be supported. Because of the structure of the stand, weight may be added to the project without fear of the locking mechanisms giving out or the stand itself breaking.

The components of the stand may be made using any desired or suitable materials, such as metal. The components may also have any desired size and shape.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. An adjustable and maneuverable taxidermy stand, the taxidermy stand comprising:
    a base assembly comprising:
        a base plate; and
        a base receiver pole extending perpendicularly from the base plate, the base receiver pole being hollow and having a shaft collar subassembly positioned at an end of the base receiver pole distal from the base plate;
    a lower hinge assembly adjustably attached to the base assembly using the shaft collar subassembly on the base receiver pole distal from the base plate, the lower hinge assembly comprising:
        a lower hinge shaft tubing having a first end and a second end, wherein the first end is sized to fit within the base receiver pole, wherein when the shaft collar subassembly on the base receiver pole is tightened, the lower hinge shaft tubing is held in place within the base receiver pole;
        a lower hinge plate attached to the second end of the lower hinge shaft tubing;
        a pair of parallel lower hinge bracket arms extending perpendicularly outward from opposite edges of the lower hinge plate, wherein the parallel lower hinge bracket arms together with the lower hinge plate form a squared-off U-shape, and wherein an upper edge of each of the lower hinge bracket arms comprises a semi-circular cut-out; and
        a pivot tube collar held by each semi-circular cut-out, wherein the pivot tube collars are attached to one another by a shaft collar subassembly, wherein the pivot tube collars are hollow, thus creating a channel;
    an upper hinge assembly pivotally attached to the lower hinge assembly using a shaft collar subassembly;
    a hub assembly adjustably attached to the upper hinge assembly using a shaft collar subassembly; and
    at least one mounting plate assembly adjustably attached to the hub assembly,
    wherein:
        each shaft collar subassembly comprises:
            a threaded collar half removably attached to a non-threaded collar half; and
            a fastener attaching the threaded collar half to the non-threaded collar half,
            wherein when the threaded collar half is attached to the non-threaded collar half an inner diameter of the shaft collar subassembly is sized to accommodate a shaft tubing.

2. The taxidermy stand of claim 1, wherein the fastener has a threaded end and a fastener head, the threaded designed to pass through a fastener channel in the non-threaded collar half and screw into a threaded orifice in the threaded collar half to secure the threaded collar half to the non-threaded collar half.

3. The taxidermy stand of claim 2, wherein the shaft collar subassembly further comprises a knob designed to engage with the fastener head to tighten the fastener.

4. The taxidermy stand of claim 1, wherein the upper hinge assembly comprises:
    an upper hinge receiver pipe with a first end and a second end, a shaft collar sub assembly attached to the second end;
    an upper hinge plate attached to the first end of the upper hinge receiver pipe;
    a pair of parallel upper hinge arms extending perpendicularly from the upper hinge plate, the upper hinge arms being spaced from one another, such that the first upper hinge arm extends from an edge of the upper hinge plate opposite the second upper hinge arm, wherein the pair of parallel upper hinge arms and the upper hinge plate together form a squared-off U-shape; and
    a pivot tube extending from an inner surface of the first upper hinge arm to an inner surface of the second upper hinge arm, wherein the pivot tube extends through the pivot tube collars to pivotally attach the upper hinge assembly to the lower hinge assembly.

5. The taxidermy stand of claim 4, wherein the hub assembly comprises:
    a hub shaft tubing having a first end and a second end, the first end being sized to be accommodated within the upper hinge bracket pipe, wherein the diameter of the hub shaft tubing is such that when the shaft collar subassembly at the end of the upper hinge receiver pipe is tightened, the hub shaft tubing is held in place within the upper hinge receiver pipe;
    an arm tubing structure attached to the second end of the hub shaft tubing, the arm tubing structure comprising a plurality of arms; and
    a hub receiver pipe attached to each of the plurality of arms, wherein each hub receiver pipe is hollow with a shaft collar subassembly attached to an end thereof distal from the arm tubing.

6. The taxidermy stand of claim 5, wherein the at least one mounting plate assembly comprises:
    a mounting plate; and
    a mounting plate shaft tube extending from the mounting plate,
    wherein the mounting plate shaft tube is designed to engage with and secure to the hub receiver pipe.

* * * * *